United States Patent [19]

Patel

[11] Patent Number: 4,594,610
[45] Date of Patent: Jun. 10, 1986

[54] CAMERA ZOOM COMPENSATOR FOR TELEVISION STEREO AUDIO

[75] Inventor: Chandrakant B. Patel, Hopewell, N.J.

[73] Assignee: RCA Corporation, Princeton, N.J.

[21] Appl. No.: 660,967

[22] Filed: Oct. 15, 1984

[51] Int. Cl.⁴ .............................................. H04N 7/04
[52] U.S. Cl. ................................... 358/144; 358/143
[58] Field of Search ............... 358/144, 143, 185, 108; 381/12, 26, 11; 352/12, 15, 25, 44

[56] References Cited

U.S. PATENT DOCUMENTS

| | | | |
|---|---|---|---|
| 3,056,854 | 10/1962 | Katzenstein et al. | 358/144 |
| 3,837,736 | 9/1974 | Ogiso et al. | 352/12 |
| 4,032,717 | 6/1977 | Mallon | 381/11 |

FOREIGN PATENT DOCUMENTS

| | | | |
|---|---|---|---|
| 0071209 | 6/1977 | Japan | 358/144 |
| 0025247 | 2/1980 | Japan | 358/144 |

OTHER PUBLICATIONS

NHK Laboratory Report #104, dated Nov. 1966.

Primary Examiner—Tommy P. Chin
Assistant Examiner—David E. Harvey
Attorney, Agent, or Firm—Eugene M. Whitacre; Peter M. Emanuel; William H. Meise

[57] ABSTRACT

A stereophonic television signal processing arrangement includes a television camera having a zoom lens capable of wide and narrow viewing angles. A sensor coupled to the zoom lens generates a control signal indicative of the current field of view. An audio signal generator such as a pair of microphones and a matrix generates L+R and L−R audio signals. In order to ameliorate a perception problem associated with expectations as to the direction (left or right) from which the audio signal comes when viewing a receiver showing a narrow-field-of-view picture, a multiplier arrangement multiplies the L+R and L−R signals by factors $K_1$ and $K_2$, respectively, which are directly and inversely related, respectively, to the control signal indicative of current field of view.

6 Claims, 5 Drawing Figures

CAMERA ZOOM COMPENSATOR FOR TELEVISION STEREO AUDIO

BACKGROUND OF THE INVENTION

This invention relates to an arrangement for adjusting the amplitudes of stereophonic left-plus-right and left-minus-right audio signals in response to the field-of-view condition of a zoom lens of a television camera viewing the scene from which the audio signals are derived.

Commercial television has until the recent past been monophonic or monaural in nature; i.e., only one audio channel was provided to accompany the video picture. The monophonic television has been well accepted. More recently, synthesized-stereophonic receivers have been introduced to the marketplace. These synthesized-stereo-audio receivers separate various frequency components of a monophonic audio signal and apply them differently to a pair of speakers associated with a television receiver in order to simulate stereophonic operation. Full or true stereophonic audio transmission standards have recently been adopted by the Broadcast Television Systems Committee of the Electronic Industries Association (EIA). According to these standards, two channels of audio are broadcast together with the television video. One audio channel is a baseband signal in the form of an audio sum signal representing the sum of the left and right audio signals (L+R) and corresponds to the convention monophonic signal. The second audio channel representing the audio difference signal (L−R) is AM double-side-band modulated onto a suppressed carrier having a frequency of twice the horizontal line frequency. The BTSC standard also provides that the L−R signal be compressed or companded for noise control.

FIG. 1 is a plan view illustrating an arrangement for generating television signals including stereophonic audio signals. FIG. 1 represents a scene which includes a stage 10 on which are arrayed a plurality of chairs 12, 14–16. A left microphone 20 and a right microphone 22 are placed near the left and right of the stage (as viewed facing the stage) and a television camera 24 is mounted to view the stage. The signals from the microphones are illustrated as being coupled over cables 26 and 28 and applied to a block 32 representing a matrix for generating L+R and L−R signals from the L and R audio signals. These L+R and L−R are in turn illustrated as being applied together with video signals from camera 24 to a modulator and transmitter illustrated as a block 34 for modulation and application to a broadcast antenna 36 for broadcast to television receivers, one of which is designated generally as 48. Receiver 48 is fitted with a viewing screen 50 and left and right loudspeakers 52 and 54, respectively, and a processing system arranged in known fashion for demodulating the received television signal to produce L+R and L−R signals and for decoding the L+R and L−R signals to produce left and right signals from loudspeakers 52 and 54, respectively. The processing system of receiver 48 produces the same signal from each of loudspeakers 52 and 54 when only a L+R signal is decoded.

The problem to which the invention is directed can be explained as follows. Camera 24 has a zoom lens 60. When the camera is in the position represented by solid lines, the zoom lens can be arranged for a wide viewing angle, so as to view the entire stage including chairs 12 through 16 and the human speakers (not shown) seated therein. Speakers near left microphone 20 produce L audio signals in microphone 20 to the substantial exclusion of R signals in right microphone 22, and likewise speakers near chair 16 activate right microphone 22 to produce R signals to the substantial exclusion of L signals. Speakers near the center of stage 10 cause activation of both microphones 20 and 22. A television viewer viewing receiver 48 displaying the scene with such a wide angle or panoramic view can see the entire stage, and the voices coming from loudspeakers 52 and 54 correspond generally to the locations of the various speakers on stage 10. However, in many cases camera 24 will be swiveled to a position such as shown by dotted lines and the zoom lens will be adjusted to a narrow viewing angle to focus onto the face of a speaker occupying chair 12. Thus, that speaker's face fills the screen 50. The viewer of screen 50 expects under those circumstances that the sound will come equally from loudspeakers 51 and 54 because the speaker is centered in viewing screen 50. However, because only left microphone 20 is near chair 12, the sound produced at the receiver will undesirably come chiefly from loudspeaker 52.

SUMMARY OF THE INVENTION

The described problem is solved by an arrangement for increasing the amplitude of the transmitted sum or monophonic (L+R) signal and correspondingly decreasing the magnitude of the difference (L−R) signal during those times when the zoom lens of the camera is zoomed so as to generate an image having a narrow viewing angle, and conversely increasing the magnitude of L−R and decreasing the magnitude of L+R during those times when zoom lens 60 produces an image representing a wide viewing angle, all under the control of a control signal generated by the zoom lens control.

DESCRIPTION OF THE INVENTION

Figure 2:
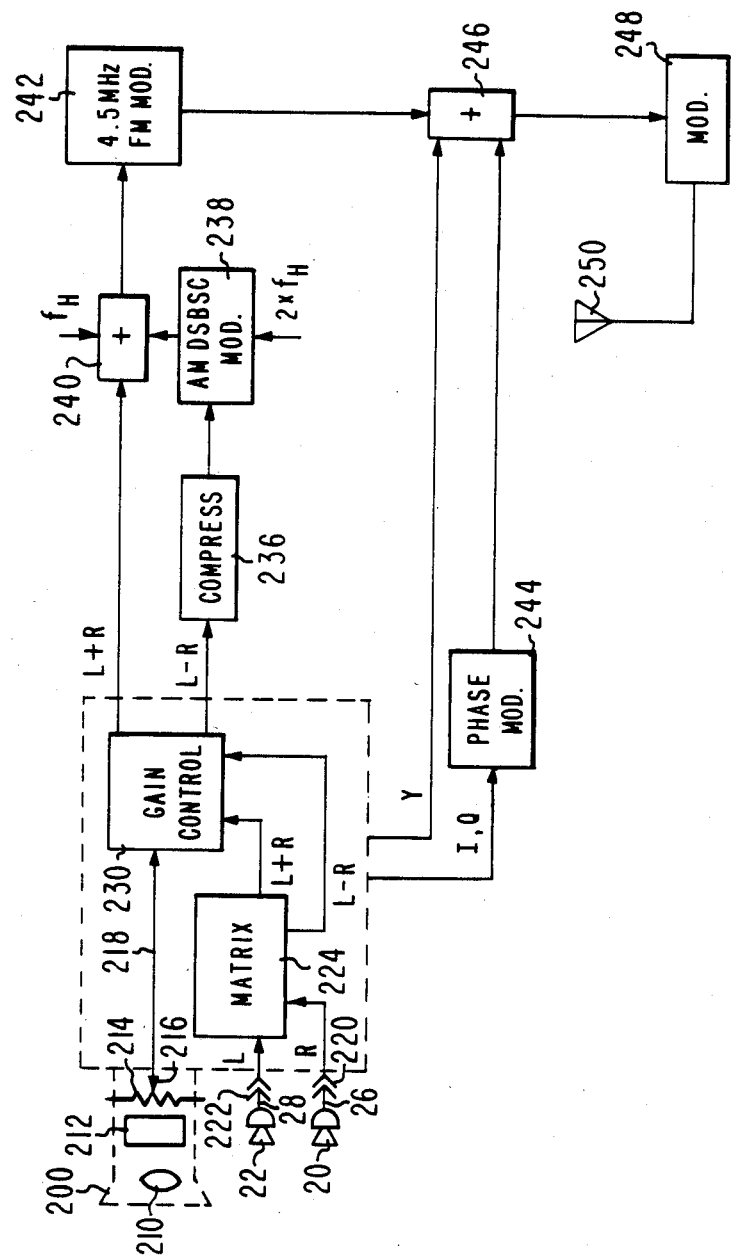
FIG. 2 is a block diagram of a television video and audio signal generating system according to the invention.
Figure 3:
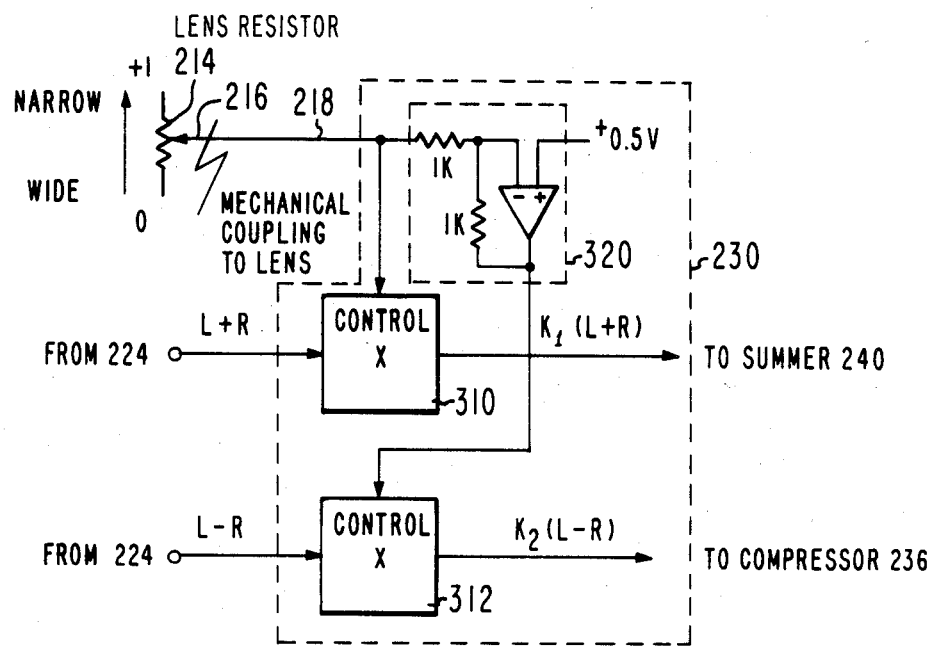
FIG. 3 is a block diagram of a portion of the system of FIG. 2.

In FIG. 2, a zoom lens illustrated generally as 200 includes lens elements 210 for focussing scenes onto an imager 212 with a controllable field of-view or viewing angle so as to provide a telephoto-type zoom closeup of a portion of a scene, or at the opposite end of the control so as to provide a wide viewing angle panoramic view of the scene. A sensor illustrated as a potentiometer 214 having a movable wiper 216 represents a transducer mechanically coupled to the zoom lens mechanism for generating on a conductor 218 a control signal representative of the viewing angle of zoom lens 200. The control signal is applied to a control signal input of a gain control illustrated as a block 230. Microphones 20 and 22 are coupled by cables 26 and 28, respectively, to terminals 220 and 222 associated with inputs of an audio matrix 224. Matrix 224 receives left and right audio signals from microphones 20 and 22 and generates L+R sum signals and L−R difference signals which are applied to audio inputs of gain control 230, details of which are illustrated in FIG. 3.

Gain control 230 in accordance with an aspect of the invention adjusts the relative magnitudes of the L+R and L−R signals depending upon the control signal applied over conductor 218. When zoom lens 200 is in a wide viewing angle condition, the control signal on conductor 218 is such as to increase the magnitude of the L−R signal (the stereophonic signal) in relation to the L+R signal (the monophonic signal) so as to provide substantial separation of the audio outputs heard from loudspeakers of a receiver such as 52 and 54 of FIG. 1. When lens 200 is in a narrow viewing angle condition as for focussing onto a single speaker, the control signal on conductor 218 increases the magnitude of the L+R signal relative to the L−R signal so that essentially a monophonic signal is produced. This has the effect of reproducing from both loudspeakers 52 and 54 in equal amounts the audio signals received by either microphone 20 or 22, thereby substantially eliminating the problem of receiving from only one loudspeaker (either 52 or 54) the voice of the only speaker seen on screen 50.

The amplitude controlled L−R signals produced by gain control 230 are applied to a compressor in accordance with BTSC standards and the compressed signals are applied to an AM double sideband suppressed carrier modulator which also receives carrier signals at twice the horizontal line rate, which corresponds to approximately 31.5 KHz for the NTSC signal as used in the United States. The modulated L−R signals are applied from modulator 238 to a summing circuit 240 to be summed with the amplitude-conditioned L+R signal from gain control 230 and with a signal at the horizontal line frequency which acts as a pilot carrier indicating the presence of a stereophonic audio broadcast. The sum audio signal is coupled from adder 240 to a 4.5 MHz FM modulator 242 to produce an FM-modulated audio signal.

The FM-modulated signals from FM modulator 242 are summed with a video luminance-representative Y signal and with phase-modulated color-representative I and Q signals from a phase modulator in an adder or summer 246. The composite video and audio television signal produced in summer 246 is applied to a modulator 248 for modulation onto a channel carrier and for broadcast by an antenna 250.

FIG. 3 illustrates details of gain control 230. Left-plus-right (L+R) signals are applied from matrix 224 to a multiplier 310 for multiplication by a control signal to produce a product signal K1(L+R) for application to summer 240. Similarly, L−R signals are applied from matrix 224 to a multiplier 312 for multiplication by a different control signal to produce a product signal K2(L−R) for application to compressor 236. The factors K1 and K2 represent amplitude, and may be considered as having values ranging from zero to one, as illustrated in more detail in conjunction with FIG. 4. In FIG. 3, the zoom lens sensor is illustrated as a resistive potentiometer 214 coupled across a reference source (not shown) having a voltage range between zero volts (which may be ground) and +1 volt. Wiper 216 may be mechanically coupled to the lens zoom mechanism for traversing resistor 214 in such a fashion as to approach the zero-volt end when the zoom lens is providing a panoramic or wide viewing angle and for approaching the +1 volt end of resistor 214 for narrow viewing angles. Thus, for a narrow viewing angle, the voltage coupled onto conductor 218 will approach +1 volt, and for wide viewing angles the voltage in conductor 218 will approach zero. For moderate angles of view between wide and narrow, conductor 218 will have a voltage near midway between zero and 1 volt, i.e. 0.5 volts. The control voltage on conductor 218 is applied to a control input of multiplier 310 and is also applied to the inverting input of an inverting amplifier 320.

Figure 4:
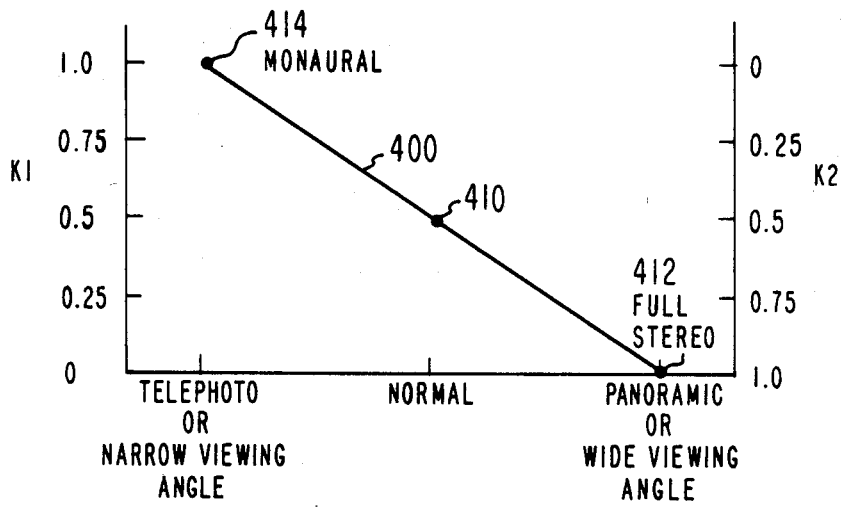
FIG. 4 is a graph of a transfer function of the arrangement of FIG. 3 as a function of zoom lens position.

Inverting amplifier 320 has its reference (+) input terminal coupled to a source (not shown) of reference voltage of +0.5 volts, corresponding to the voltage selected when slider 216 is coupled to the center of resistor 214. Consequently, when slider 216 is coupled to the center of resistor 214, corresponding to a central condition of zoom midway between a wide viewing angle and a narrow viewing angle, inverting amplifier 320 has +0.5 volts applied to its reference and inverting input terminals, and produces an output voltage equal to +0.5 volts, which is applied to the control input terminal of multiplier 312. Since the control input voltage of multiplier 310 is also +0.5 volts at this time, multipliers 310 and 312 each multiply their respective input signals by a factor related to 0.5. For simplicity, it may be assumed that L+R and L−R are each multiplied by 0.5 (or equivalently, attenuated by 6.0 dB) to produce attenuated L+R and L−R signals in which K1 equals K2 equals 0.5. This condition of K1 and K2 is illustrated in FIG. 4 by the point 410 of locus 400 for the case of a normal viewing angle. At the left of FIG. 4, the value of K1 can be seen to be 0.5 and at the right of FIG. 4 the corresponding value of K2 is also 0.5. Thus, at normal viewing angles the audio signal is neither full stereo nor monoaural, but somewhere between.

As the zoom lens is mechanically controlled to a wide viewing angle condition, wiper 216 moves down along resistor 214 to pick progressively more negative voltages from resistor 214. At the extreme of travel, corresponding to a panoramic or wide field of view condition, the voltage is zero. The zero voltage is applied to the control input of multiplier 310 to produce essentially zero L+R. Zero volts applied to the inverting input of amplifier 320 and compared with the 0.5 reference voltage produces an output voltage of +1 volt, which is applied to the control input terminal of multiplier 312 to produce an L−R signal multiplied by a factor K2 equal to unity. This point is illustrated in FIG. 4 as point 412 corresponding to full stereophonic operation in the panoramic or wide field of view condition. Similarly, in the narrow viewing angle or telephoto condition of the zoom lens, the mechanical coupling causes wiper 216 to proceed toward the top end of resistor 214 and to pick from resistor 214 voltages which are progressively more positive, with the value of +1 volt at the upper extreme of travel. The +1 volt is applied to the control input of multiplier 310 to produce an L+R signal multiplied by a factor K1 equal to unity, while the output of inverting amplifier 320 becomes zero volts, causing multiplier 312 produce an L−R signal multiplied by $K_2=0$. This operating point is illustrated as point 414 in FIG. 4 and corresponds to monaural or monophonic operation.

While only three particular operating conditions have been described, it will be appreciated that there is a continuum of operating conditions lying along locus 400. Naturally, there is no particular reason that the locus 400 of FIG. 4 must be a straight line, and the control signals may be conditioned to produce curved loci.

Figure 1:
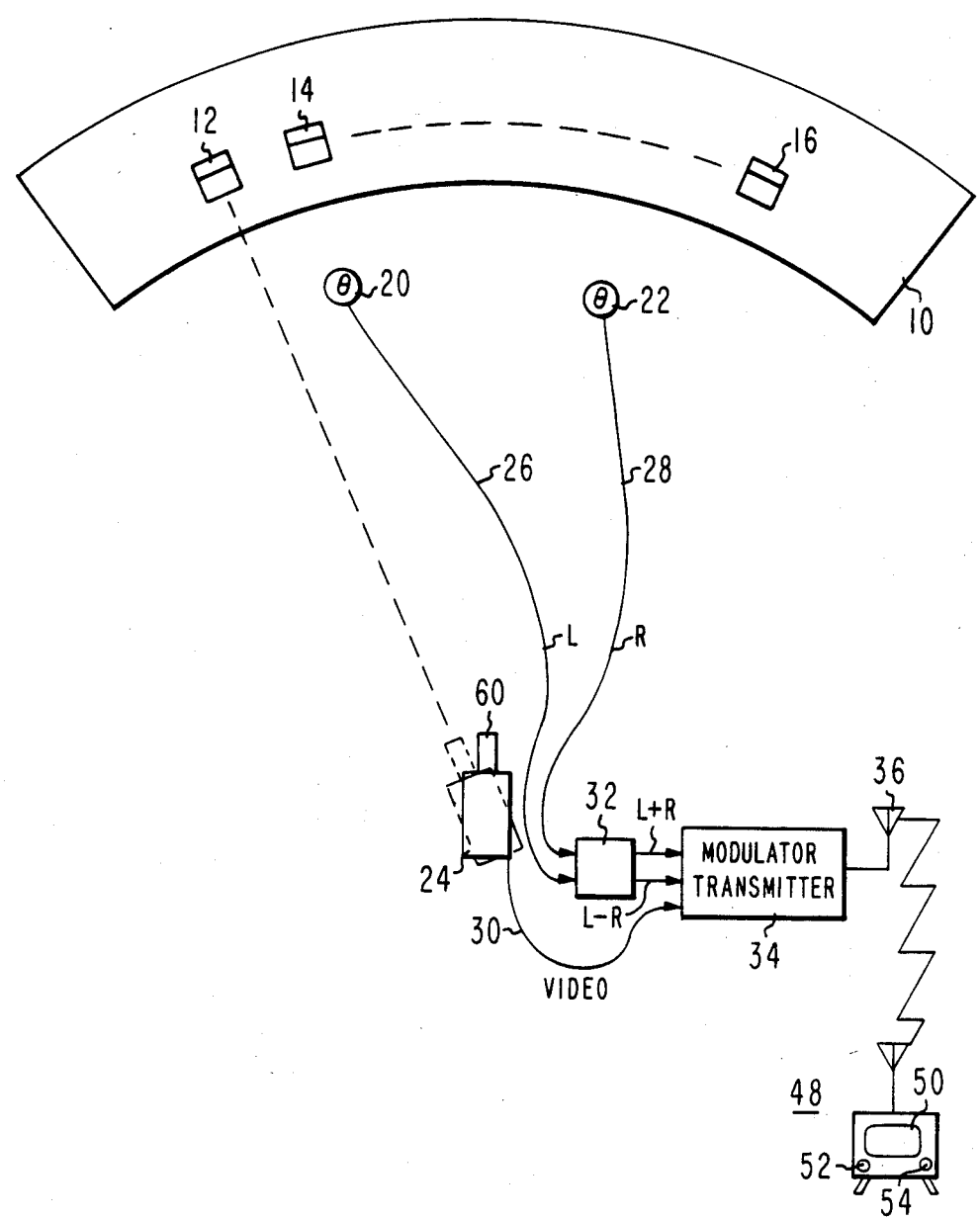
FIG. 1, already described, is a semi-pictorial plan view and block diagram of a scene and television stereophonic transmission system useful in describing the problem to which the invention is directed.
Figure 5:
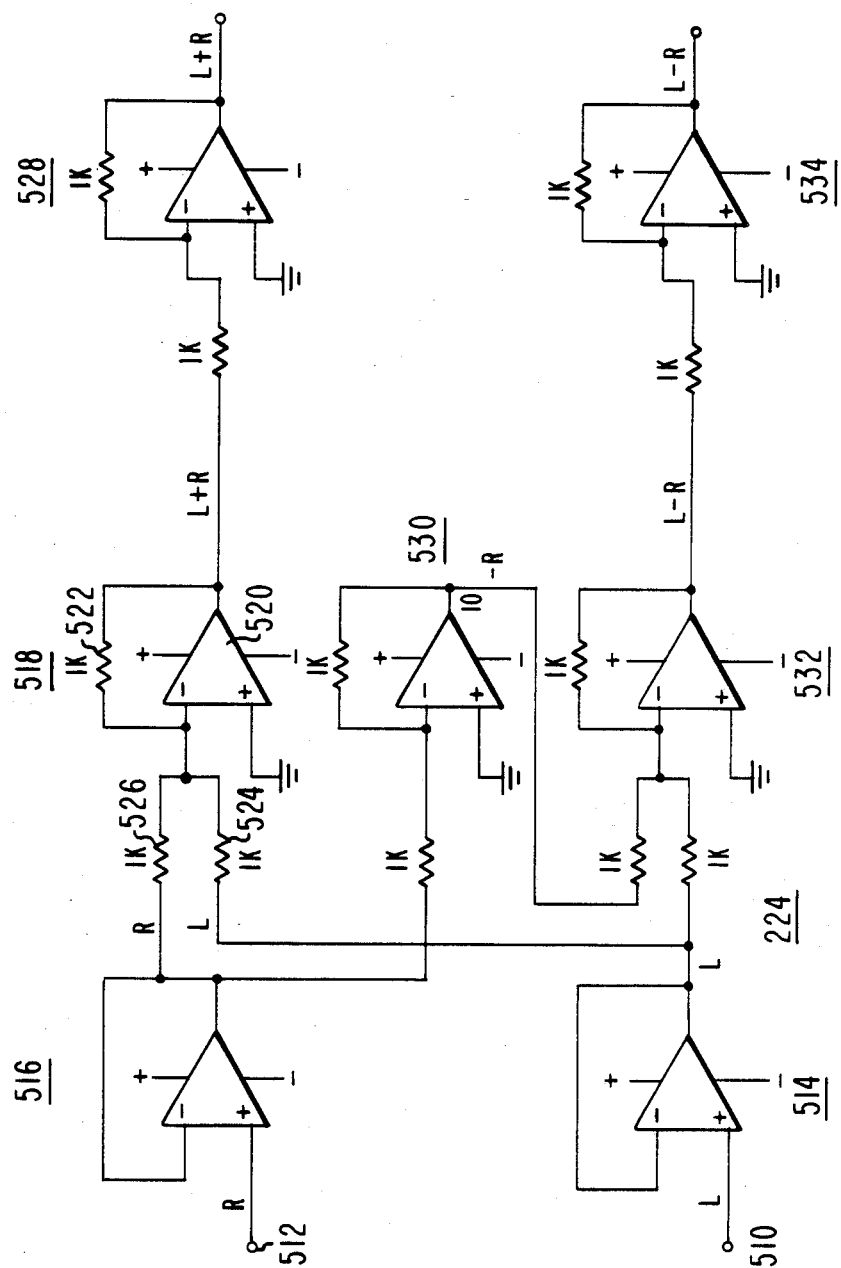
FIG. 5 is a schematic diagram of a portion of the arrangement of FIG. 2.

FIG. 5 illustrates a matrix 224 which may be used for receiving L and R signals for generating L+R and L−R signals in the arrangements of FIGS. 1 or 2. In FIG. 5, L signals are applied to an input terminal 510 and R signals are applied to an input terminal 512 for application to L and R buffer or voltage-follower amplifiers 514 and 516, respectively, which produce at their output terminals buffered L and buffered R signals, respectively. The buffered L and buffered R signals from amplifiers 514 and 516 are applied to an adder- or summer designated generally as 518 and including an integrated circuit amplifier 520, feedback resistor 522 and input resistors 524 and 526. Summer 518 adds together the buffered L and R signals to produce L+R signals which are applied to an output amplifier designated generally as 528. The buffered R signal at the output of amplifier 516 is applied to an inverter-connected amplifier designated generally as 530 which inverts the R signal to produce a −R signal which is applied to one input of a second summing amplifier designated generally as 532. The buffered L signal is applied from amplifier 514 to a second input of summer 532. Summer 532 adds together the L signal and the inverted R signal to produce L−R signal which is applied to an output amplifier 534.

Other embodiments of the invention will be apparent to those skilled in the art. For example, additional audio signals (second audio signals) such as second-language signals modulated onto 5 $f_H$ may be added to the L+R and L−R signals for broadcast. The additional audio signals would not ordinarily be amplitude-controlled in conformance to the camera zoom angle. The gain control 230 may be physically located in the same physical housing with the video-producing television camera, in which case connectors or jacks for coupling the microphones to the gain control may be externally-accessible jacks on the camera. Gain control 230 may also be a free-standing unit having its own power supply and input jacks to which L−R, L+R and zoom lens angle-representative signals may be coupled. Any zoom lens field of view sensor may be used, rather than a potentiometer. For example, a series of switches activated at different zoom positions may produce either logic signals or switch an analog circuit for generating a stepped-analog signal representative of various regions of viewing angle. While equal-amplitude L+R and L−R signals have been described for the case of a normal field of view, any desired relationship may be considered the starting point.

What is claimed is:

1. A television video and audio signal generation and processing system for generating video and audio signals representative of a scene, comprising:
    imaging means for generating television signals representing an image focussed onto a photosensitive surface;
    stereo signal means for generating at least left-plus-right audio sum signals and left-minus-right audio difference signals representative of audio signals derived from different portions of said scene;
    zoom lens means optically coupled to said photosensitive surface for focussing thereupon a selected portion of said scene representing a selected viewing field, said zoom lens means further comprising viewing-field signal generating means responsive to said selected viewing field for generating a viewing field signal representing the particular viewing field selected; and
    audio signal processing means coupled to said stereo signal means and to said zoom lens means for controlling the magnitudes of said audio sum signals and said audio difference signals so that said audio sum signal has a relatively large magnitude and said audio difference signal has a relatively small magnitude when said viewing field is least and so that said audio sum signal has a relatively small magnitude and said audio difference signal has a relatively large magnitude when said viewing field is maximum.

2. A system according to claim 1 wherein said stereo signal means comprises left means for supplying a left-audio signal and right means for supplying a right-audio signal; and matrixing means for adding together said left-audio and right-audio signals to form said sum signal and for subtracting said left-audio and right-audio signals for forming said difference signal.

3. A system according to claim 1 wherein said audio signal processing means comprises first multiplier means including an input terminal coupled for receiving said audio sum signal and second multiplier means including an input terminal coupled for receiving said audio difference signal, each of said first and second multiplier means further including a control input terminal for control of said magnitudes of said audio sum signal and said audio difference signal.

4. A system according to claim 3 further comprising control signal processing means coupled to said zoom lens means and to said audio signal processing means for conditioning said viewing field signal for applying conditioned viewing field signals to said control input terminals of said first and second multiplier means for controlling the multiplication factor of said first multiplier means as a first function of said conditioned viewing field signal about a nominal value of said conditioned viewing field signal, and for controlling the multiplication factor of said second multiplier means as a second function of said conditioned viewing field signal which is the inverse of said first function relative to said nominal value.

5. A television camera, comprising:
    a zoom lens including mechanical viewing angle control means;
    sensor means coupled to said zoom lens and responsive to said mechanical viewing angle control means for forming a viewing angle representative control signal;
    multiplexing means coupled to said sensor means and adapted for receiving audio sum signals representing the sum of a plurality of audio signals derived from different portions of a scene and for receiving audio difference signals representing the difference between a plurality of audio signals derived from different portions of a scene for translating said audio sum signal to an audio sum output terminal with an amplitude related in a first sense to said control signal, and for translating said audio difference signal to an audio difference output terminal with an amplitude related in a second sense opposite to said first to said control signal.

6. An audio signal processing means for processing L+R and L−R audio signals and adapted for use with a camera having a zoom lens and a sensor coupled to said zoom lens for generating a field-of-view signal representing a particular field-of-view selected, said processing means comprising:

control signal input terminal means adapted to be coupled to receive said field-of-view signal;

first and second audio signal input terminal means adapted to be coupled to receive said L+R and L−R signals, respectively; and processing means coupled to said control signal input terminal means and to said first and second audio signal input terminal means for controlling the relative magnitudes of said L+R and L−R audio signals in response to said field-of-view signal.

* * * * *